Patented Sept. 11, 1951

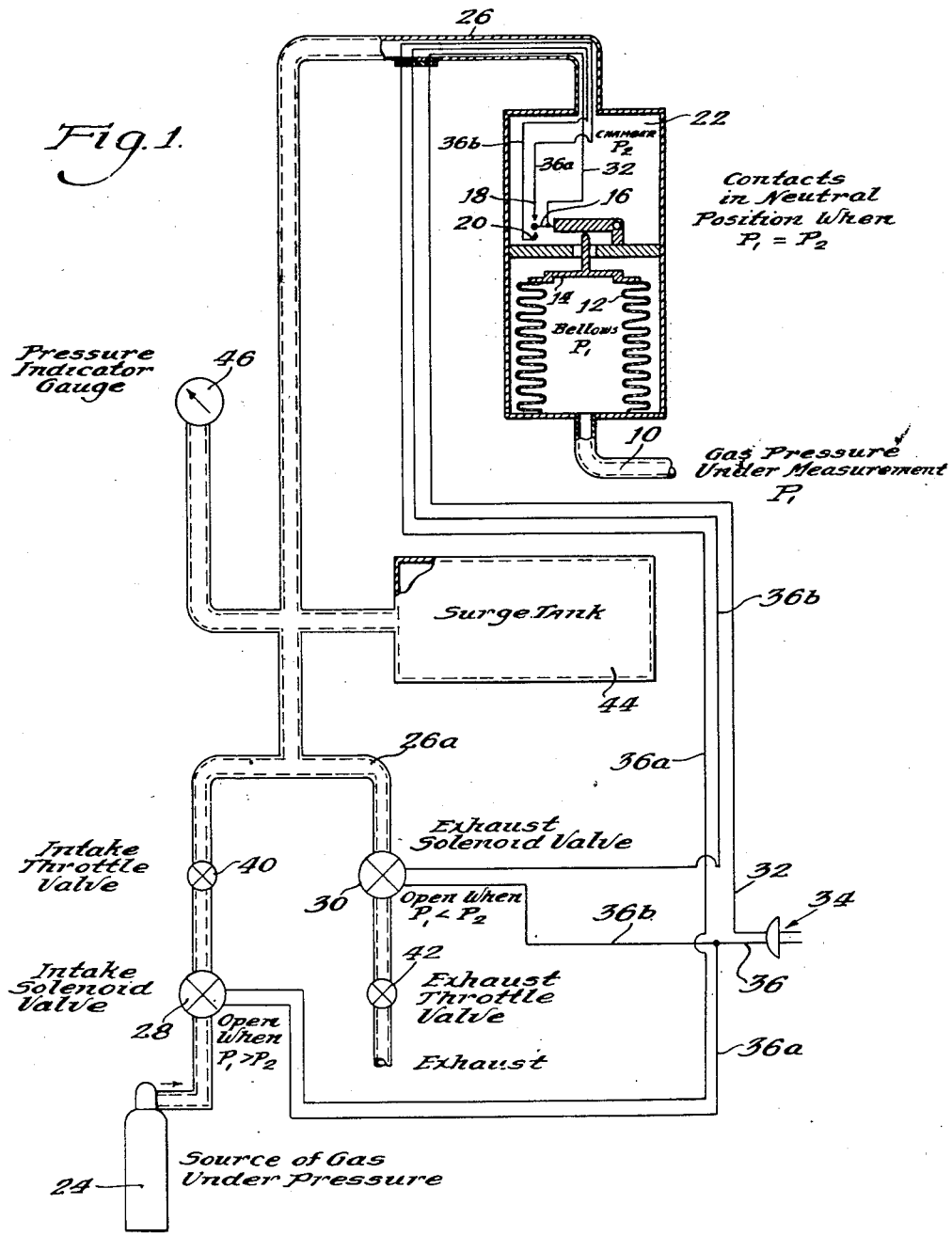

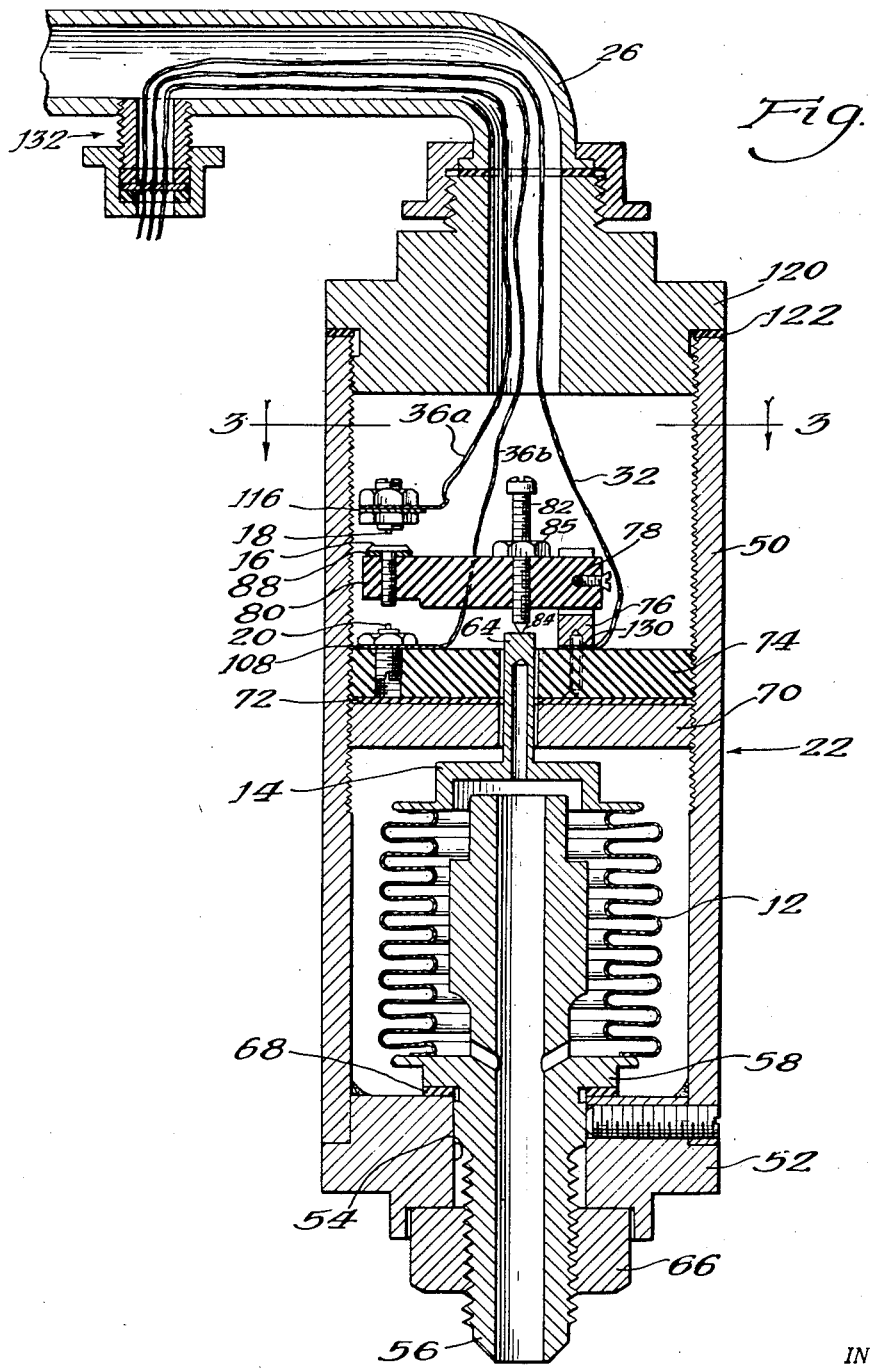

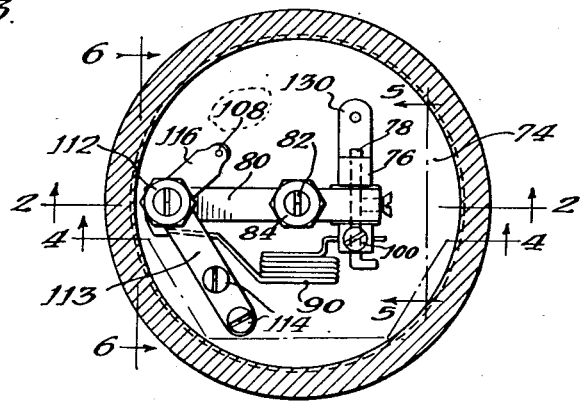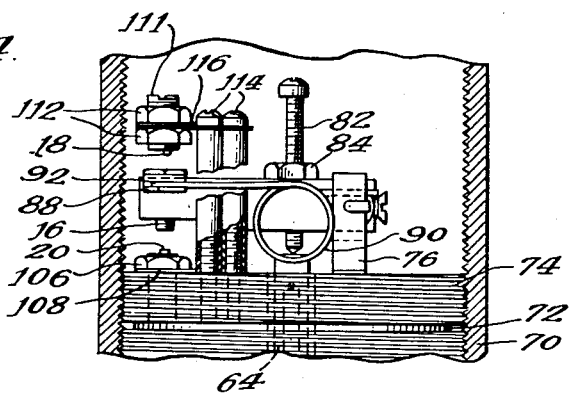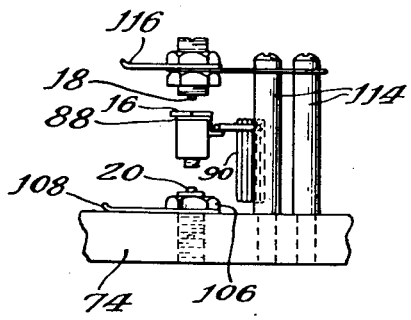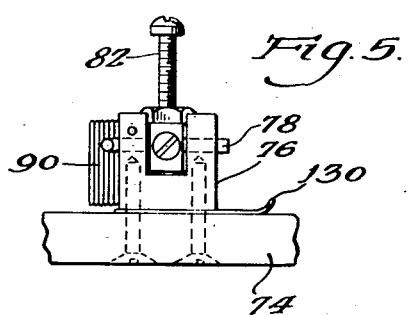
INVENTOR.
Ralph Livingston

2,567,519

UNITED STATES PATENT OFFICE 2,567,519

PRESSURE MONITORING DEVICE

Ralph Livingston, Oak Ridge, Tenn., assignor to the United States of America as represented by the United States Atomic Energy Commission Application February 27, 1948, Serial No. 11,612

1 Claim. (Cl. 73—410)

This invention relates to an improved apparatus for the measurement and control of fluid pressures. The invention is particularly directed to apparatus for monitoring the pressure of highly corrosive gases.

Difficulty is encountered in monitoring the pressure of extremely reactive gases with ordinary apparatus. In conventional apparatus for the measurement or control of gas pressures, portions of delicate mechanisms, such as gauges, are exposed to the corrosive action of the gas. In attempting to monitor the pressure of gases, such as uranium hexafluoride, it is found that the material of the gauge is so badly attacked by the gas that the gauge becomes unusable after a relatively short period of time. Certain metals, such as nickel and copper, and brass alloys, are relatively stable in the presence of such gases, but the making of sensitive conventional gauges which are sufficiently resistant to corrosion is not practical.

The present invention provides a system for monitoring gas pressure of such a reactive gas which, although simple and inexpensive, is nevertheless highly accurate and capable of long service even when used with such a corrosive gas as uranium hexafluoride.

The apparatus of the present invention may be broadly described as a system wherein conventional measuring means are employed to measure the pressure of the reactive gas indirectly; the pressure of the reactive gas being automatically balanced by the pressure of a simple nonreactive gas such as nitrogen, and the pressure of the latter gas directly measured, thus constituting a measure of the pressure of the reactive gas. The system whereby automatic balancing of the pressures is obtained may be used not only for measurement, but may also be employed for automatic control of the pressure of the reactive gas. Thus the system may be adapted for single measurement monitoring or automatic control monitoring.

One embodiment of the invention, which will suffice to demonstrate the teachings of the invention to persons skilled in the art, is illustrated in the attached drawing in which:

Fig. 1 is a diagrammatic illustration of a pressure measurement system, structural portions being distinguished from electrical connections by inner dotted lines indicating wall thicknesses;

Fig. 2 is a central vertical sectional view of the chamber assembly constituting one of the elements illustrated diagrammatically in Fig. 1;

Fig. 3 is a horizontal sectional view of the chamber, the view being shown partly in elevation and taken along the line 3—3 of Fig. 2;

Fig. 4 is a fragmentary vertical sectional view, partly in elevation through the chamber, the view being taken along the line 4—4 of Fig. 3;

Fig. 5 is a fragmentary side elevational view of certain portions of the assembly housed in the chamber, the view being taken along line 5—5 of Fig. 3 in the direction indicated by arrows; and Fig. 6 is a fragmentary side elevational view of other elements of the assembly with the side wall of the casing removed, the view being taken along the line 6—6 of Fig. 3 in the direction indicated by arrows.

Referring first to Fig. 1, the gas pressure under measurement, as in a vacuum line (not illustrated), designated P1, is introduced through a conduit 10 which is preferably of a nonreactive material such as copper. The conduit 10 is connected to the interior of an inverted cup-shaped bellows 12 of corrosion-resistant metal. Coupled to an end diaphragm 14 of the bellows 12 is an electrical contact piece 16, which moves up and down as the bellows expands and contracts. Above and below the movable contact 16 are fixed contacts 18 and 20 respectively. The bellows 12 is surrounded by a closed chamber 22, the contacts 16, 18, and 20 being enclosed within the chamber 22. The chamber 22 is connected to a source of gas under pressure 24 by a conduit 26. A normally closed solenoid valve 28 is inserted in the flow path between the chamber 22 and the gas source 24. A second branch 26a of the conduit 26 also connects the chamber 22 to an external exhaust region, such as the atmosphere, through a second normally closed solenoid valve 30.

One side 32 of a two-wire electrical power line 34 is connected to the contact 16 which moves with the bellows diaphragm 14. The other side 36 of the power line 34 is connected by lead 36a to the upper contact 18 through the windings of the solenoid valve 28 and by lead 36b to the lower contact 20 through the windings of the solenoid valve 30. Thus when the bellows 12 expands to the point where the moving contact 16 makes contact with the upper contact 18, the normally closed intake solenoid valve 28 is opened, permitting the flow of gas from the source 24 into the chamber 22, the pressure P2 in the chamber 22 thus rising until the bellows 12 is again compressed sufficiently so that contact is broken between the contacts 16 and 18. At this point the valve 28 returns to its normally closed position and gas no longer flows into the chamber 22.

Similarly when the bellows 12 is compressed by an excess of pressure in the chamber 22 to the point where contact is made by the contacts 16 and 20, solenoid valve 30 is opened and gas is exhausted from the chamber 22 to the point where the circuit through contacts 16 and 20 is again broken.

In this manner the gas pressure P2 within the chamber 22 is automatically maintained substantially equal to the gas pressure P1 in the bellows 12, which is the pressure of the gas under measurement. Throttle valves 40 and 42 are placed in the intake and outlet branches of the conduit 26 respectively to govern the speed of response and to prevent oscillation of the system. A surge tank 44 is likewise connected to the conduit 26. The pressure P2 in the chamber 22 is read by means of a conventional pressure gauge 46 connected to the conduit 26.

It may be seen that the indication of the gauge 46 constitutes an accurate measure of the pressure of the gas under measurement, since the pressure in the chamber 22 is kept equalized with the pressure in the bellows 12. The device may thus be used for the measurement of the pressure of highly reactive gases without exposing any portion of the device other than the corrosion-resistant bellows to the chemical action of the reactive gas. The gas supplied by the source 24 is of course a relatively inert gas such as nitrogen, which cannot damage the equipment.

The general operation of the device schematically illustrated in Fig. 1 having been described, there may now be described the physical structure of the chamber 22 and the elements therein contained which are illustrated schematically and in simplified fashion in Fig. 1. As shown in Figs. 2–6, the chamber 22 is constructed of a side wall 50 of brass tubing with a base 52 soldered thereto. The base 52 has a large central aperture 54 through which protrudes an externally threaded boss 56 constituting an extension of a base 58 of the cylindrical bellows 12, to the top of which is soldered the rigid diaphragm 14 and piston 64 substantially in the cross-sectional form of an inverted T. The boss 56 is externally threaded and cooperates with a nut 66 to compress an annular gasket 68 between the bottom surface of the base 58 and the upper surface of the base 52, thus providing a support for the bellows assembly and preventing leakage of air or gas between the surrounding atmosphere and the region within the chamber 22 surrounding the bellows 12. The outer end of the threaded boss 56 also serves as a nipple for the attachment of a conduit such as that designated by the numeral 10 in Fig. 1. The boss 56 and the base 58 are apertured to admit gas into the bellows 12. The inner surface of the upper portion of the wall 50 is threaded to receive an externally threaded disk 70 which serves as a stop to prevent expansion of the bellows 12 beyond the elastic limit thereof, and the disk 70 is apertured to pass freely the piston 64 and permit the free passage of gas therearound. An insulating gasket 72 which rests upon the disk 70 is similarly apertured, as is a base 74 for the electrical contact assembly to be described below.

The base 74 is an externally threaded disk of an insulating material such as a phenol-formaldehyde resin. To the base 74 is screwed an upwardly extending yoke 76 of brass. The yoke 76 has transverse apertures in the arms thereof receiving a pin 78 which extends across the yoke to act as a pivot for a lever 80 on an insulating material such as phenol-formaldehyde resin. A screw 82 extends downwardly through the lever 80 with the lower end 84 of the screw 82 resting on the upper end of the piston 64. The lever 80 is thus pivoted in accordance with the position of the diaphragm 14 as defined by expansion of the bellows 12. The position of the lever 80 for any given condition of expansion of the bellows 12 may be adjusted by rotation of the screw 82 which may be locked in position by a locknut 85.

At the outer end of the lever 80 is the contact screw 16 extending vertically through, and in threaded engagement with the lever 80. The screw 16 is preferably of a material such as silver, the advantages of which as the material of electrical contacts are well known in the art. A lug 88 beneath the head of the screw 16 protrudes from the side of the lever 80. A coiled spring 90 has one end 92 resting on the lug 88 and the other end threaded through an aperture in the yoke 76 and held in place therein by a setscrew 100. The spring 90 thus serves both to bias the lever 80 downward, so that the device may be operated in any position, and to provide electrical contact between the contact screw 16 and the yoke 76. Beneath the contact screw 16 is the silver contact 20 screwed into the base 74 and held in place by a nut 106 which also serves to retain a contact lug 108. Above the contact screw 16 is a contact 18 at the end of a screw 111 secured by nuts 112 to a plate 113 which is mounted upon and spaced from the base 74 by posts 114 which are screwed to the base 74. A contact lug 116 is provided for the upper contact 18.

Closure of the chamber 22 is effected by a cap 120 and gasket 122, the cap being apertured centrally and being connected in conventional pipe-coupling fashion to conduit 26. The electrical lead wires from the contacts 18 and 20 are connected to the respective lugs 116 and 108, and the third lead wire is connected to a lug 130 secured to the yoke 76. The three lead wires are brought out through the conduit 26 and thence through a conventional gas-tight seal 132.

Operation of the structure described above when considered with the schematic drawing of Fig. 1 and the description of that figure heretofore given will be obvious.

A large number of modifications of the specific embodiments of the invention described above and illustrated in the drawing will readily occur to persons skilled in the art. Although the bellows arrangement shown has great advantage, it is contemplated that the movable contact may be driven by other structures which are within the spirit of the invention. Likewise many other possible arrangements of the contacts will readily be apparent. Other modifications, some equally obvious and others less obvious, will likewise appear to persons skilled in the art after study.

What is claimed is:

In pressure monitoring apparatus for gases of high reactivity, in combination: a first chamber; a second chamber adjacent the first chamber and having a coupling aperture adapted to be connected to a source of pressure under measurement; a pressure-distensible member separating said chambers; an electrical contact on the exterior of the second chamber insulated from and coupled to the distensible member and movable therewith; fixed electrical contacts on the exterior of the second chamber and insulated therefrom and selectively contacted by said movable contact in response to movement of the distensible member; two normally closed electrically operated valves; a source of fluid connected to the first chamber by the first of said valves, the second valve being connected between said first chamber and an exhaust; and two electrical circuits each including one of said electrically operated valves and one of said fixed contacts, whereby the fluid pressure in the first chamber is maintained equal to the fluid pressure in the second chamber and the second chamber is insulated from the electrical circuits.

RALPH LIVINGSTON.

REFERENCES CITED

The following references are of record in the file of this patent:

UNITED STATES PATENTS

| Number | Name | Date |
|---|---|---|
| 1,631,958 | Gent | June 14, 1927 |
| 1,780,179 | Elliott et al. | Nov. 4, 1930 |
| 2,013,252 | Pigott | Sept. 3, 1935 |
| 2,062,437 | Abbott et al. | Dec. 1, 1936 |
| 2,265,114 | Hartley | Dec. 2, 1941 |
| 2,388,542 | Hobbs | Nov. 6, 1945 |

FOREIGN PATENTS

| Number | Country | Date |
|---|---|---|
| 715,429 | France | Dec. 3, 1931 |